United States Patent
Robuck

(10) Patent No.: US 7,507,180 B2
(45) Date of Patent: Mar. 24, 2009

(54) EPICYCLIC GEAR TRANSMISSION FOR ROTARY WING AIRCRAFT

(75) Inventor: Mark Robuck, Chadds Ford, PA (US)

(73) Assignee: The Boeing Company, Chicago, IL (US)

( * ) Notice: Subject to any disclaimer, the term of this patent is extended or adjusted under 35 U.S.C. 154(b) by 329 days.

(21) Appl. No.: 11/431,779

(22) Filed: May 10, 2006

(65) Prior Publication Data

US 2007/0265134 A1    Nov. 15, 2007

(51) Int. Cl.
*F16H 57/08*    (2006.01)

(52) U.S. Cl. ...................................... 475/336

(58) Field of Classification Search .................. None
See application file for complete search history.

(56) References Cited

U.S. PATENT DOCUMENTS

| | | | | |
|---|---|---|---|---|
| 676,234 A * | 6/1901 | Humpage | ................... | 475/306 |
| 1,499,763 A * | 7/1924 | Davis | ................... | 475/336 |
| 1,761,308 A * | 6/1930 | Morgan | ................... | 475/308 |
| 1,902,374 A * | 3/1933 | Pirinoli | ................... | 475/332 |
| 5,242,336 A * | 9/1993 | Hori | ................... | 475/336 |
| 5,385,514 A * | 1/1995 | Dawe | ................... | 475/336 |
| 5,910,066 A * | 6/1999 | Schulz et al. | ................ | 475/336 |
| 6,123,640 A * | 9/2000 | Schulz | ................ | 475/341 |
| 6,220,984 B1 | 4/2001 | Schulz et al. | | |

FOREIGN PATENT DOCUMENTS

| | | |
|---|---|---|
| DE | 43 25 295 A | 2/1995 |
| DE | 4325295 A | 2/1995 |
| DE | 195 10 499 A | 9/1996 |
| DE | 19510499 A | 9/1996 |
| DE | 195 25 831 A | 1/1997 |
| DE | 19525831 A | 1/1997 |
| DE | 19720255 A | 10/1998 |
| DE | 197 20 255 A | 12/1998 |
| DE | 197 56 967 A | 6/1999 |
| DE | 19525831 A | 6/1999 |
| EP | 1188002 A | 3/2002 |
| WO | WO 00/79149 | 6/1999 |

* cited by examiner

*Primary Examiner*—Dirk Wright
(74) *Attorney, Agent, or Firm*—Tung & Associates

(57) ABSTRACT

An epicyclic gear transmission primarily intended for use in rotary wing aircraft that utilizes a plurality of planet gears axially spaced on a planet gear shaft. The planet gear shaft is tilted or inclined at an axis with respect to the center axis of the input shaft or sun gear. In addition, the planet gears may include a shallow angle face gear. The tilted axis planet gears obtain a reduction in size of the transmission and correspondingly reduce the overall weight thereof.

20 Claims, 2 Drawing Sheets

EPICYCLIC GEAR TRANSMISSION FOR ROTARY WING AIRCRAFT

CROSS-REFERENCE TO RELATED APPLICATIONS

Not Applicable.

BACKGROUND OF THE INVENTION

1. Field of the Invention

The present invention relates generally to a gear transmission for transmitting power from a power source to an output shaft; and more specifically, to an epicyclic gear transmission having tilted axis planets.

2. Description of Related Art

Modern rotary wing aircraft; i.e., helicopters, typically utilize a gas turbine engine to drive a rotor. A gearbox located between the engine and the rotor transfers power and functions as a speed reduction unit. The gearbox or main rotor gear transmission is normally the heaviest single subsystem in the drive system of the aircraft.

Currently, the final transmission stage in virtually all main rotor drives is an epicyclic transmission system that typically consists of one or two simple, spur gear planetary stages. These planetary gear stages are composed of a sun gear driven by the input shaft of the transmission, multiple planet gears (typically between three and six) that intermesh with the sun gear and are spatially arranged around the periphery of the sun gear, and an orbit gear or internal ring gear that intermeshes with and surrounds the multiple planet gears. The orbit or internal ring gear is generally the fixed member of the epicyclic transmission system. The multiple planet gears are mounted to a carrier that in turn is operatively connected to the output shaft of the transmission. While this basic epicyclic gear transmission provides relatively good power efficiency, it has a tendency to generate high noise levels in operation due to the limited contact ratio of the sun gear and the internal ring gear with the multiple planet gears.

U.S. Pat. No. 6,966,865, the disclosure of which is hereby incorporated by reference in the present application, discloses one type of a gear transmission for use with a rotary wing aircraft. The '865 patent illustrates a gear transmission including a compound epicyclic gear system using a planet gear shaft having a larger planet gear and two smaller planet gears on the same planet gear shaft. The two smaller planet gears may be configured as double helical planet gears that are axially staggered in their positions on the planet gear shaft. The epicyclic gear transmission of the '865 patent has the basic components of an epicyclic gear system including a sun gear input, a fixed ring gear or internal gear, and a planet gear carrier output. As disclosed, the planet gear of the epicyclic gear system is a planet gear cluster that includes the smaller double helical planet gears and the larger planet gear both located on the same planet gear shaft. The smaller double helical planet gears are axially spaced from the larger planet gear. The sun gear meshes with the larger planet gear and the fixed ring gear meshes with the smaller planet gears. The planet gears have 2 distinct variations, there is a long planet and a short planet which allow the planets to be intermeshed. Intermeshing of the large gear end of the planets results in smaller packaging of the transmission.

While such an epicyclic gear transmission is suitable for use in a rotary wing aircraft, a reduction in package or envelope size and corresponding weight reduction is desirable. Accordingly, design improvements that reduce the footprint of the gear transmission along with the weight thereof provide an additional advantage for current epicyclic gear transmissions.

SUMMARY OF THE INVENTION

The present invention provides an epicyclic gear transmission that includes improvements in the packaging or envelope size while correspondingly reducing the overall weight thereof. In one embodiment of the present invention, the epicyclic gear transmission utilizes a plurality of planet gears located on a planet gear shaft. The planet gears revolve around a sun gear secured to an input shaft. A planet gear carrier is secured to an output shaft whereby power from a motive source is transferred through the epicyclic gear transmission to the output shaft.

The longitudinal or center axis of the planet gear shaft is tilted or inclined at an angle with respect to the longitudinal or center axis of the input shaft or sun gear. Tilting or inclining the planet gear shaft in this manner enables a reduction of the overall envelope or housing size of the epicyclic gear transmission, which correspondingly reduces the weight thereof since the gears are reduced in size.

An additional embodiment of the invention has the basic form of the epicyclic gear transmission with a sun gear, fixed ring or internal gear and a planet gear carrier. Each planet gear has a shallow angle face gear at the large end of the planet shaft that mates with one of the ring gear or sun gear. A shallow angle face gear may also be referred to as conical spur gear, or conical. helical gear, or beveloid gear.

The use of a tilted axis planet gear shaft that tilts the axis of the planet gears with respect to the sun gear and corresponding input shaft enables a reduction in the outer housing size, which correspondingly reduces the weight of the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
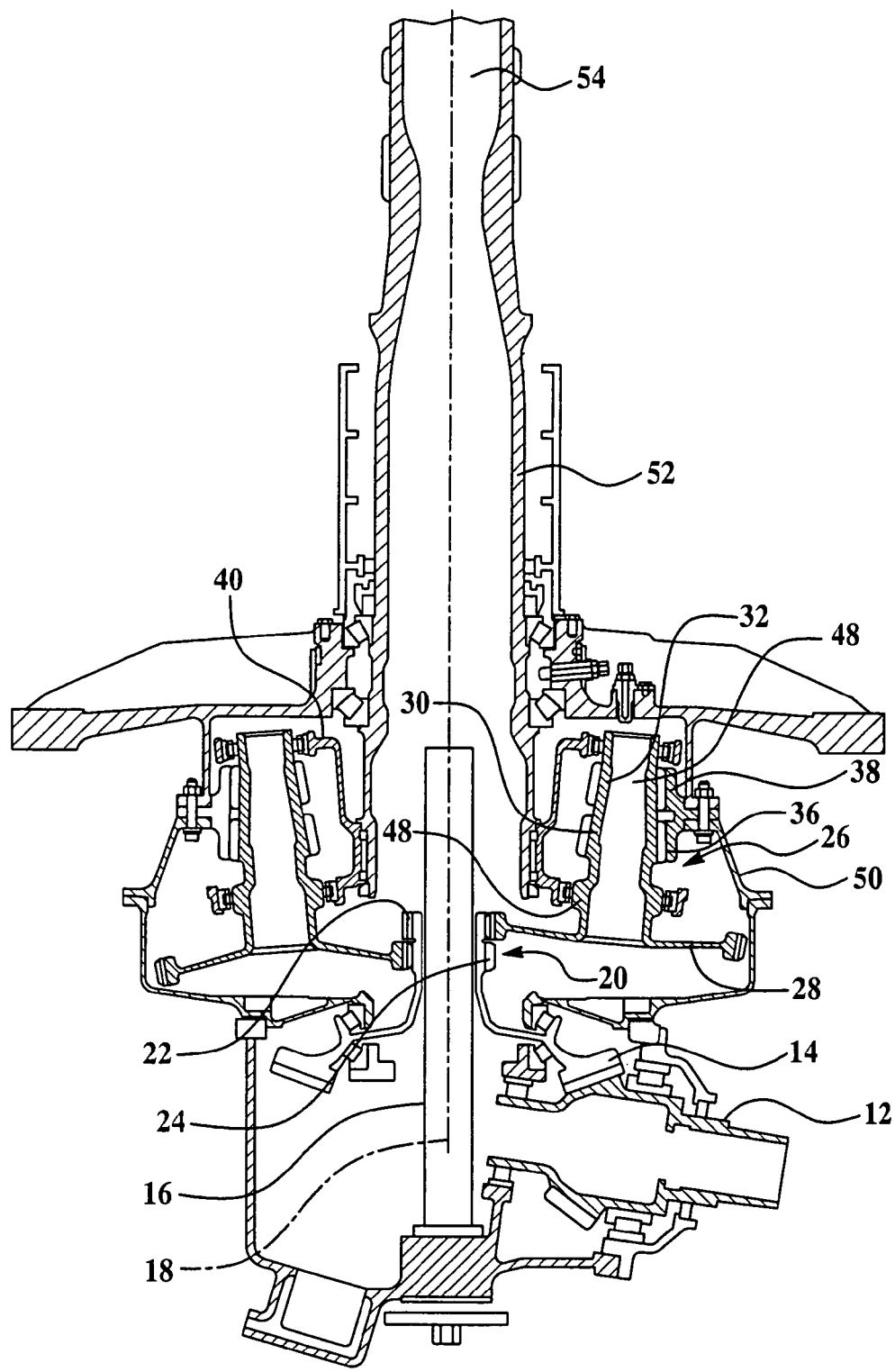
FIG. 1 is a side sectional view of a preferred embodiment of an epicyclic gear transmission according to the present invention.
Figure 2:
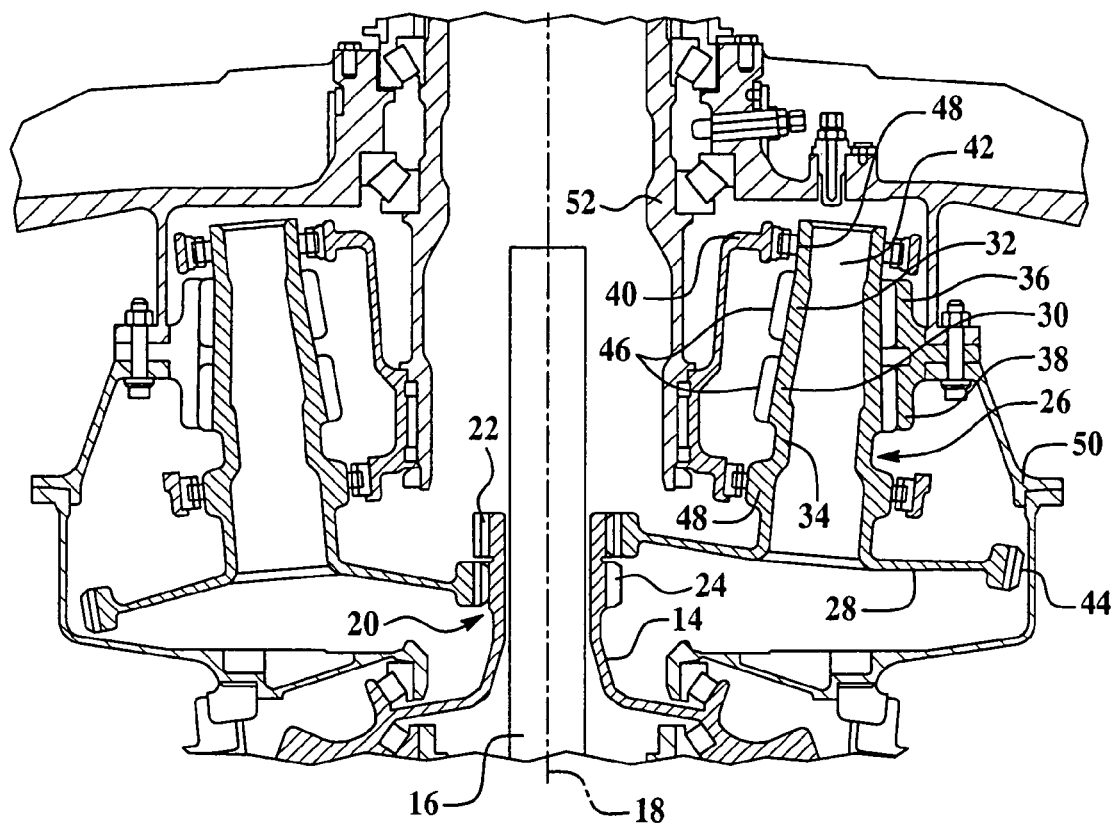
FIG. 2 is an enlarged side sectional view of the epicyclic gear transmission according to FIG. 1.

An epicyclic gear transmission 10 according to the present invention is illustrated in FIGS. 1-2. The epicyclic gear transmission 10 is intended for use in rotary wing aircraft; i.e., helicopters, is well suited as the main rotor drive or a single or double rotor for a single or double rotor aircraft or a tilt rotor aircraft. The epicyclic gear transmission 10 makes use of a tilted axis planet gear to reduce the overall size of the epicyclic gear transmission housing 50 and correspondingly reduces the overall weight.

As illustrated in FIG. 1, the epicyclic gear transmission 10 is located within a housing 50. Power from a motive source (not shown) is transferred through the epicyclic gear transmission 10 to an output shaft 52 used to drive the rotary wing. In the disclosed embodiment, an input drive shaft 12 receives power from the motive source (not shown) and transfers the power from the motive source through a (spiral bevel) ring gear 14 having a center or longitudinal axis 18 that is also the center axis of the epicyclic gear transmission 10. As illustrated herein, the center or longitudinal axis 54 of the output shaft 52 is coincident with the center or longitudinal axis 18 of the ring gear 14

A sun gear cluster 20 is located on the (spiral bevel) ring gear 14. In the present embodiment, the sun gear cluster 20 is shown as part of the (spiral bevel) ring gear 14 and is mounted over a stationary standpipe 16. The sun gear cluster 20 may also be attached to the (spiral bevel) ring gear 14. As illustrated in FIGS. 1-2 the sun gear cluster 20 is comprised of two sun gears 22, 24 mounted on the (spiral bevel) ring gear 14. The sun gears 22, 24 are double spur gears, though they are not limited to only spur gears. The sun spur gears are separated by a gap that is a safety feature limiting potential for tooth breakage.

A plurality of planet gears, seen generally at 26, are rotatably mounted and secured in a planet gear carrier 40 whereby each of the sun gears 22, 24 meshes with a corresponding planet gear 26. As with a standard epicyclic gear transmission, rotation of the sun gear cluster 20 causes rotation of the planet gear 26 that correspondingly rotates against a ring gear 36 to rotate the planet gear carrier 40. Rotation of the planet gear carrier 40 correspondingly rotates the output shaft 52 connected to the planet gear carrier 40.

In the present embodiment, each planet gear 26 includes a first, larger planet gear 28 and second and third, smaller planet gears 30, 32 located on a planet gear shaft 34. The first, larger planet gear 28 of one of the planet gears 26 meshes with one of the sun gears 22 while the first, larger planet gear 28 of a second planet gear 26 meshes with the adjacent sun gear 24. As illustrated in FIG. 2 the second and third, smaller planet gears 30, 32 mesh with a pair of ring gears or internal gears 36, 38. Accordingly, the first and second, smaller planet gears 30, 32 have the same axial position on their planet gear shafts 34 relative to the planet gear carrier 40. As illustrated in U.S. Pat. No. 6,966,865 incorporated herein by reference, the larger planet gears 28 are axially staggered and interleaved with respect to one another within the planet gear carrier 40, which correspondingly reduces the overall size of the housing 50 and subsequent gear transmission footprint. The second and third, smaller planet gears 30, 32 are each double helical gears of opposite hand teeth wherein the helix angles of the gear teeth can be varied to essentially eliminate the axial loading on the planet gear shafts 34 of the respective planet gears 26.

Figure 3:
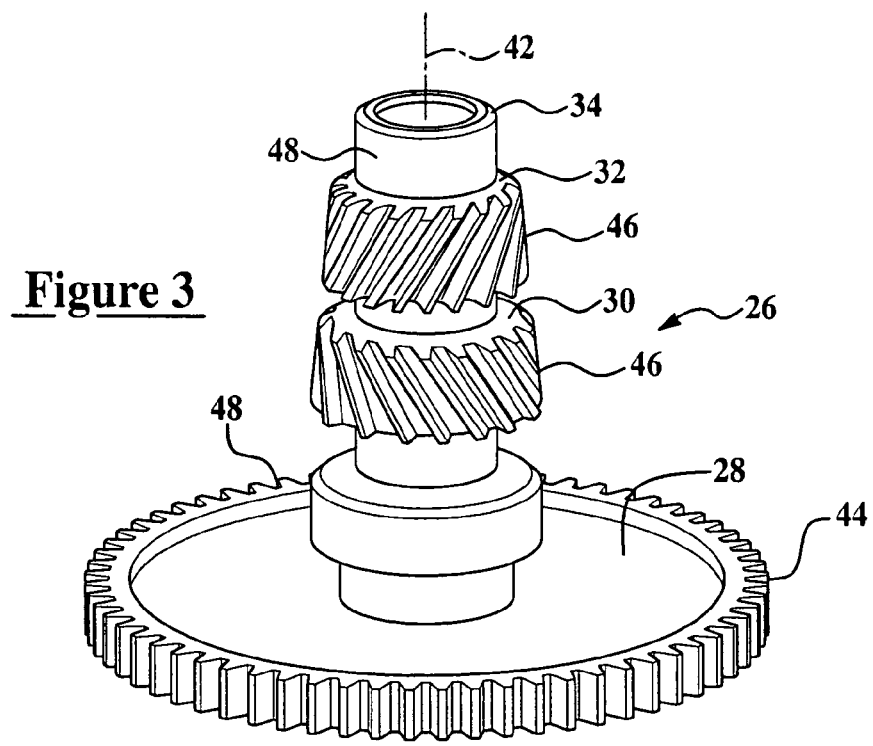
FIG. 3 is a perspective view of a planet gear for use with an epicyclic gear transmission according to the present invention.

The planet gear shaft 34 has a center or longitudinal axis 42. As illustrated in FIGS. 2-3 the longitudinal axis 42 of the planet gear shaft 34 is tilted or inclined with respect to the center or longitudinal axis 18 of the (spiral bevel) ring gear 14 and stationary standpipe 16 or sun gears 22, 24. The planet gear shaft 34 is tilted outward and away from the output shaft 52 and inward towards the input shaft 16. Accordingly, the second and third smaller planet gears 30, 32 are positioned at a larger diameter closer to the or internal ring gears 36, 38 and the first, larger planet gear 28 is positioned at a smaller diameter closer to the sun gears 22, 24. Tilting the planet gear shaft 34 in this manner reduces the overall diameter of the respective first, larger planet gear 28 and the second and third, smaller planet gears 30, 32. In addition, it also reduces the size or diameter of the corresponding sun gears 22, 24.

As the longitudinal axis 42 of the planet gear shaft 34 is tilted with respect to the longitudinal axis 18 of the (spiral bevel) ring gear 14 and sun 20, the first, larger planet gear 28 and the second and third smaller planet gears 30, 32 are also tilted at an angle with respect to the center or longitudinal axis 18 of the (spiral bevel) ring gear 14. Both the sun gears 22, 24 and ring or internal gears 36, 38 have gear teeth that are parallel to the center or longitudinal axes 18, 54 of the input and output shafts 16, 52. Accordingly, the respective face gear teeth 44 on the first, larger planet gear 28 and the second and third smaller planet gears 30, 32 have a shallow angle face $_{[r1]}$ gear enabling them to mate with the respective sun gears 22, 24 and ring or internal gears 36, 38.

Turning to FIG. 3 there is shown a planet gear 26 according to the present invention including a planet gear shaft 34 having a center or longitudinal axis 42. A first, larger planet gear 28 having a plurality of shallow angle face gear teeth 44 having a smaller face is located at one end of the planet gear shaft 34. The shallow angle face gear teeth 44 mate with the sun spur gear 22. Located near the opposite end of the planet gear shaft 34 are second and third smaller planet gears 30, 32 having a plurality of shallow angle helical face gear teeth 46 located concentrically with the planet gear shaft 34. As set forth above, the second and third smaller planet gears 30, 32 have double helical arrangement to reduce or eliminate axial loads. Bearing surfaces 48, located on the planet gear shaft 34 engage bearings located in and used to support the planet gears 26 within the planet gear carrier 40.

In one example of a preferred embodiment of the present invention, the planet gear shaft 34 and correspondingly the planets, are tilted at 5°. The second and third smaller gears 30, 32 have 18 teeth, a shallow angle face gear pitch cone of 10 degrees included angle and mate with the 108 tooth, five-pitch, 28° helical, opposing staggered tooth, 2.1 face width double helical ring gears 36, 38. The first, larger planet gear 28 has 63 teeth, a shallow angle face gear pitch cone of 10 degrees included angle and a smaller face with no helical spiral since it mates with one of the spur sun gears 22, 24. The sun gear 22, 24 has a smaller diameter and now has a 22 tooth, five pitch, 1.35 inch face width spur gear as opposed to the previous sun gear (which had 24 teeth, 5 pitch gears in a previous arrangement). Reducing the overall diameter of the sun gear and the first planet gear combination, reduces the overall housing size, which eliminates spatial problems associated with a large housing and further results in a weight reduction. In addition, reduction in the diameter of the respective sun gears and planets also results in a weight reduction and corresponding weight savings.

Accordingly, the epicyclic gear transmission of the preferred embodiment utilizes tilted axis planets to reduce the weight and size of gearbox transmissions used for rotary wing aircraft.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An epicyclic gear transmission comprising:
   a sun gear having a center axis;
   a ring gear;
   a planet gear, said planet gear including a planet gear shaft and a plurality of planet gears located on and axially spaced on said planet gear shaft wherein one of said planet gears having a larger number of teeth with respect to said plurality meshing with said sun gear and at least one of said planet gears having a smaller number of teeth with respect to said plurality meshing with said ring gear; and said planet gear shaft having a center axis, said center axis of said planet gear shaft tilted with respect to said center axis of said sun gear.

2. An epicyclic gear transmission as set forth in claim 1 wherein said planet gear meshing with said sun gear is a shallow angle face gear.

3. An epicyclic gear transmission as set forth in claim 1 wherein said planet gear meshing with said ring gear is a shallow angle face gear.

4. An epicyclic gear transmission as set forth in claim 1 wherein said planet meshing with said sun gear is a shallow angle face gear and said planet gear meshing with said ring gear is a shallow angle face gear.

5. An epicyclic gear transmission as set forth in claim 1 wherein at least one of said planet gears meshing with said sun gear and said sun gear is a shallow angle face and at least one of said planet gear meshing with said ring gear and said ring gear has a shallow angle face.

6. An epicyclic gear transmission as set forth in claim 1 wherein said plurality of planet gears located on and axially spaced on said planet gear shaft includes first and second planet gears, said first planet gear being the largest planet gear on the planet gear shaft.

7. An epicyclic gear transmission as set forth in claim 6 wherein said first planet gear meshes with said sun gear and said second planet gear meshes with said ring gear.

8. An epicyclic gear transmission as set forth in claim 7 wherein said first planet gear is a shallow angle face gear and said second planet gear is a shallow angle face helical gear.

9. An epicyclic gear transmission as set forth in claim 6 including a third planet gear; and said ring gear including a pair of fixed ring gears wherein said first planet gear engages said sun gear and said second planet gear engages only one fixed ring gear of said pair of fixed ring gears and said third planet gear engages only an other ring gear of said pair of fixed ring gears.

10. An epicyclic gear transmission as set forth in claim 9 wherein said second and third planet gears are double helical gears of opposite hand teeth.

11. An epicyclic gear transmission comprising a rotor transmission of a rotary wing aircraft comprising:

a sun gear having a center axis;

a ring gear having a center axis, the ring gear center axis being coaxial with the sun gear center axis;

a plurality of planet gears having center axes that are inclined at an angle with the center axis of the sun gear and the ring gear, the plurality of planet gears being mounted on a planet gear shaft, one of said plurality of planet gears having a larger number of teeth with respect to said plurality meshing with said sun gear and at least one of said planet gears having a relatively smaller number of teeth with respect to said plurality meshing with said ring gear, said diameter and number of teeth of said sun gear reduced relative to an arrangement where said plurality of planet gears have center axes disposed parallel to said center axis of said sun gear; and a carrier supporting the planet gear shafts for rotation of the planet gear shafts relative to the carrier.

12. An epicyclic gear transmission as set forth in claim 11 wherein the sun gear is driven by an input shaft; and the ring gear being fixed.

13. An epicyclic gear transmission as set forth in claim 11 wherein the ring gear being one of a pair of fixed ring gears; and at least two planet gears on each planet gear shaft, each of said planet gears meshing with one of said ring gears of said pair of ring gears.

14. An epicyclic gear transmission as set forth in claim 11 wherein the planet gear that meshes with the sun gear does not mesh with the pair of ring gears.

15. An epicyclic gear transmission as set forth in claim 11 wherein at least one of said planet gear meshing with said sun gear and said sun gear has a shallow angle face and at least one of said planet gear meshing with said ring gear and said ring gear has a shallow angle face.

16. An epicyclic gear transmission comprising:

a sun gear having a center axis;

a ring gear;

a planet gear, said planet gear including a planet gear shaft and a plurality of planet gears located on and axially spaced on said planet gear shaft wherein at least one of said planet gears meshes with said sun gear and at least one of said planet gears meshes with said ring gear;

said planet gear shaft having a center axis, said center axis of said planet gear shaft tilted with respect to said center axis of said sun gear;

at least one of said planet gears meshing with said sun gear and said sun gear has a shallow angle face and at least one of said planet gears meshing with said ring gear and said ring gear has a shallow angle face; and said plurality of planet gears located on and axially spaced on said planet gear shaft including first and second planet gears, said first planet gear being the largest planet gear on the planet gear shaft and meshing with said sun gear;

wherein said ring gear includes a pair of fixed ring gears wherein said first planet gear engages said sun gear and said second planet gear meshes with only one fixed ring gear of said pair of fixed ring gears and said third planet gear meshes with only an other fixed ring gear of the pair of fixed ring gears.

17. The epicyclic gear transmission as set forth in claim 16 wherein said epicyclic gear transmission comprises a rotor transmission of a rotary wing aircraft.

18. The epicyclic gear transmission as set forth in claim 16 wherein said center axis of said planet gear shaft is tilted with respect to said center axis of said sun gear at an angle of about 5 degrees.

19. The epicyclic gear transmission as set forth in claim 1 wherein said center axis of said planet gear shaft is tilted with respect to said center axis of said sun gear at an angle of about 5 degrees.

20. The epicyclic gear transmission as set forth in claim 11 wherein said plurality of planet gears have center axes that are inclined at an angle of about 5 degrees with respect to the center axis of the sun gear and the ring gear.

* * * * *